Feb. 19, 1957  A. J. MURPHY  2,781,788
LOOM
Filed Aug. 20, 1951  10 Sheets-Sheet 1

INVENTOR
Arthur J. Murphy
BY
Charles H. Brown
ATTORNEY

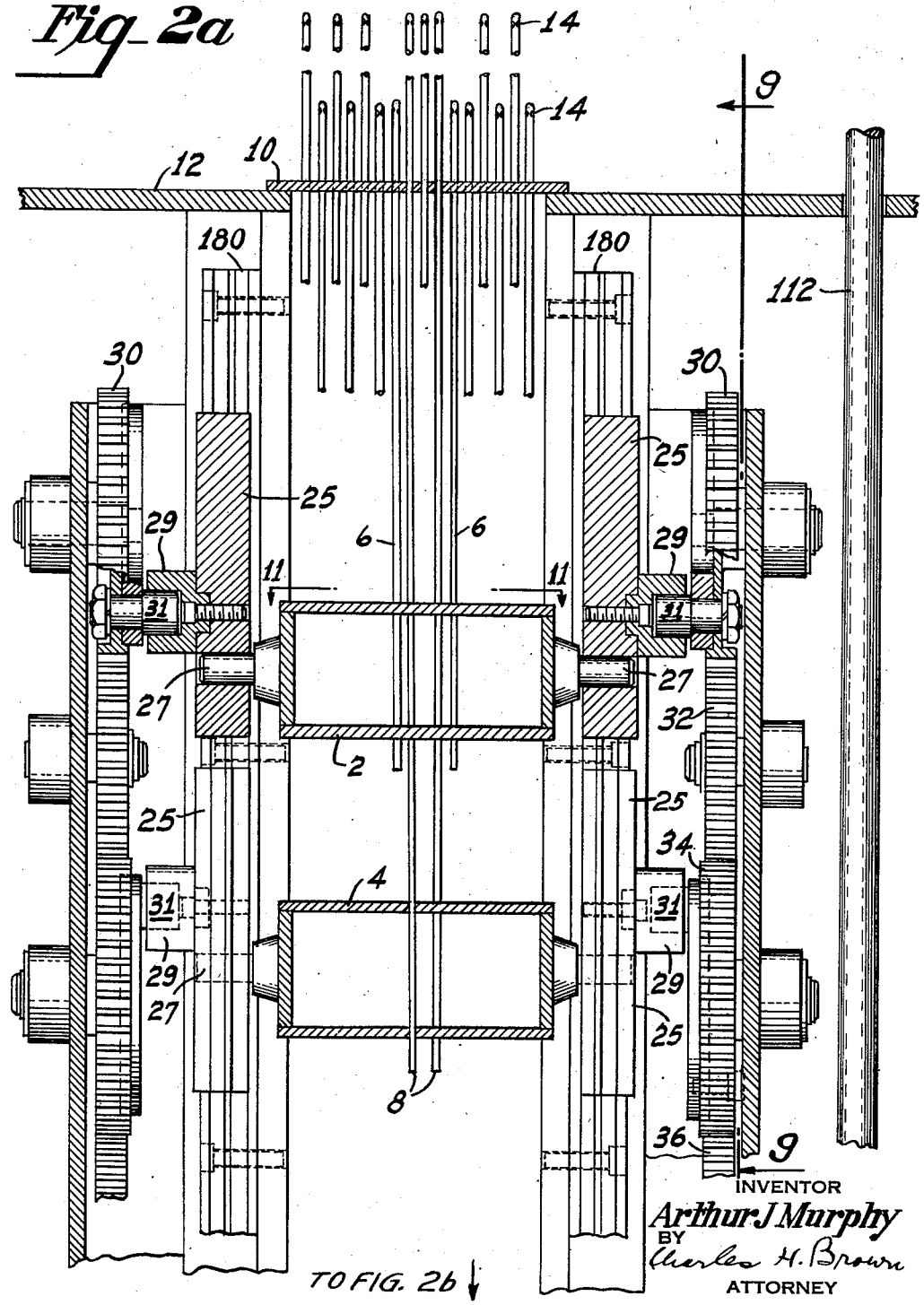

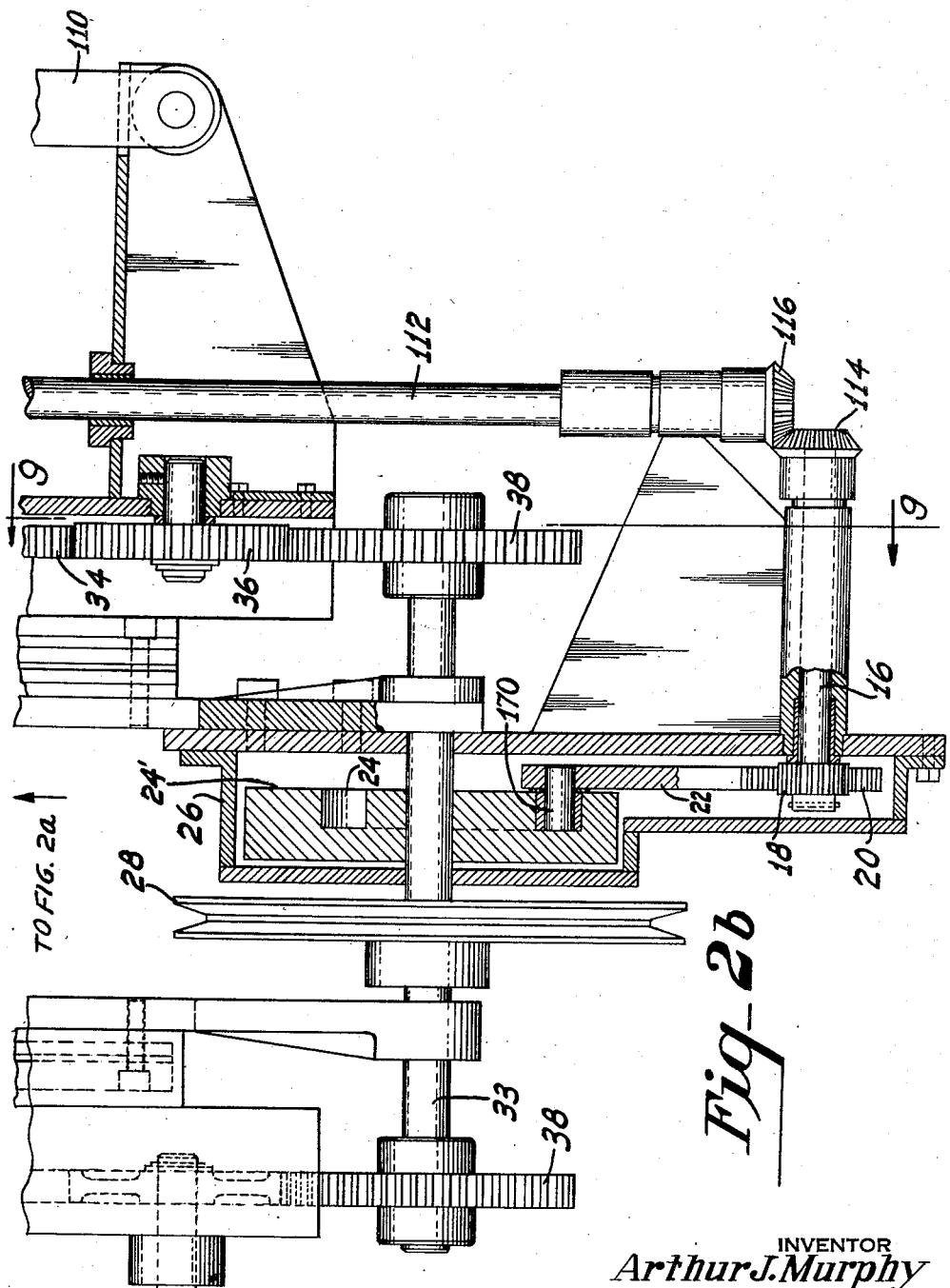

Feb. 19, 1957  A. J. MURPHY  2,781,788
LOOM

Filed Aug. 20, 1951  10 Sheets-Sheet 4

INVENTOR
Arthur J. Murphy
BY
Charles H. Brown
ATTORNEY

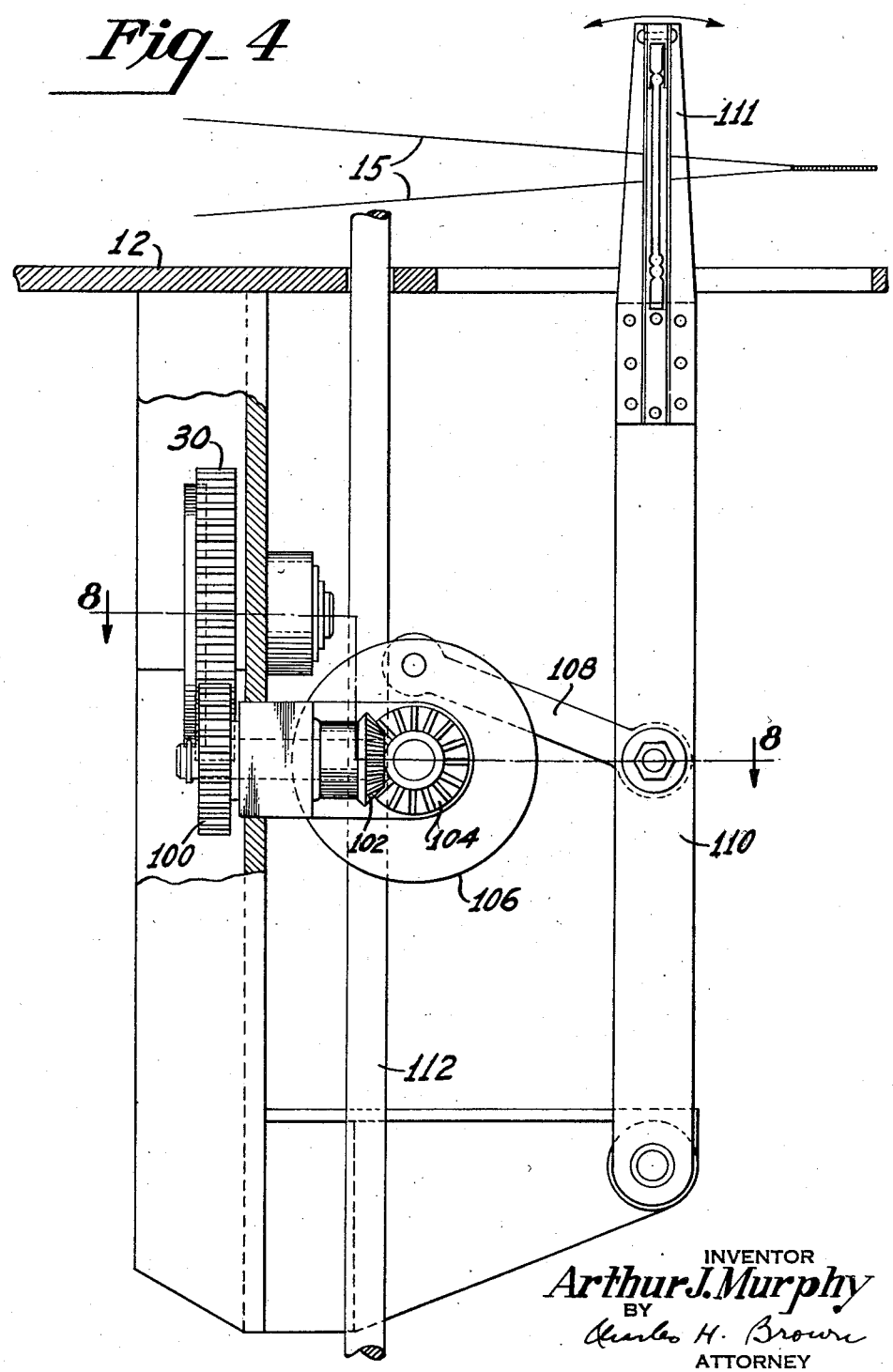

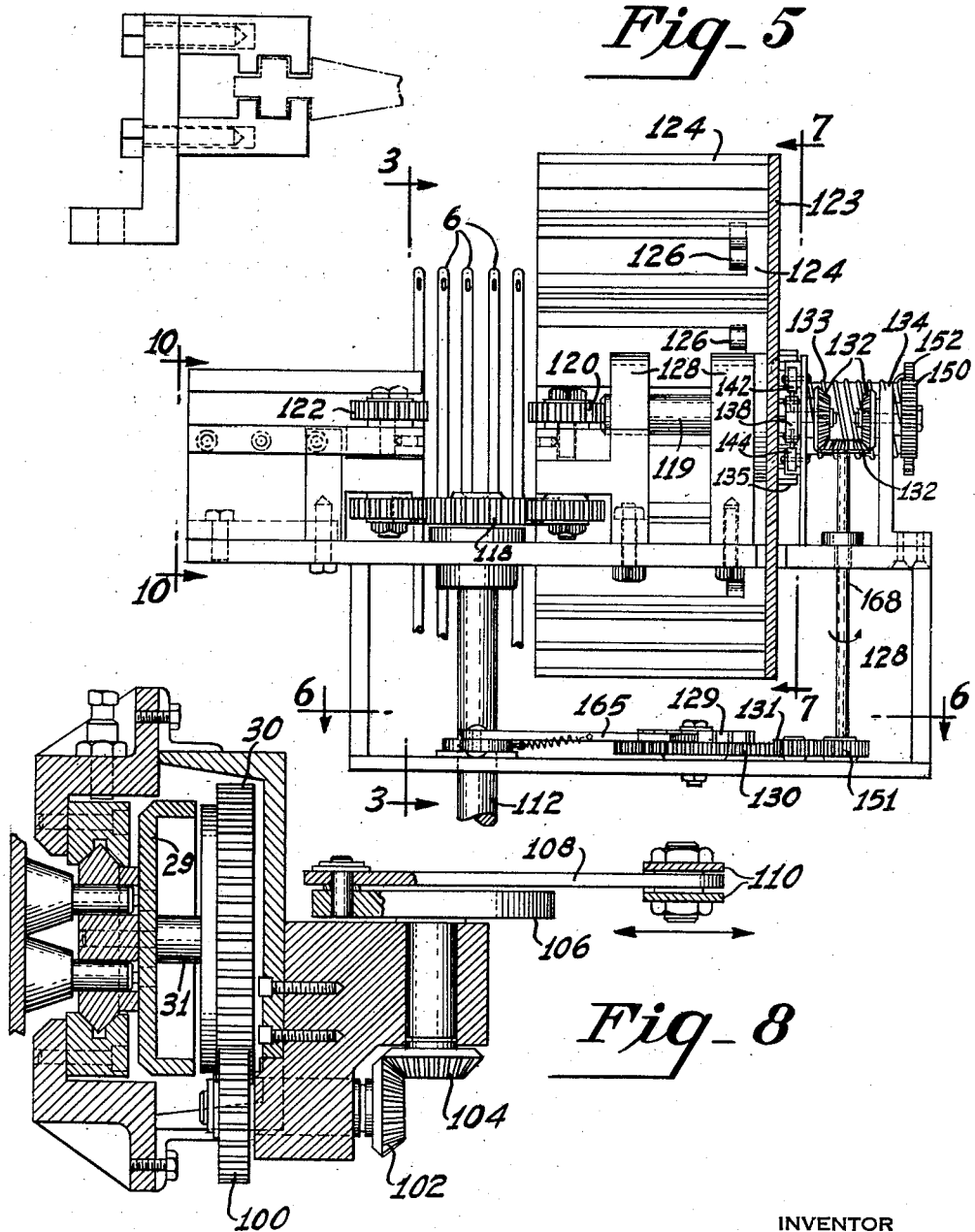

Feb. 19, 1957 A. J. MURPHY 2,781,788
LOOM
Filed Aug. 20, 1951 10 Sheets-Sheet 7
*Fig_7*
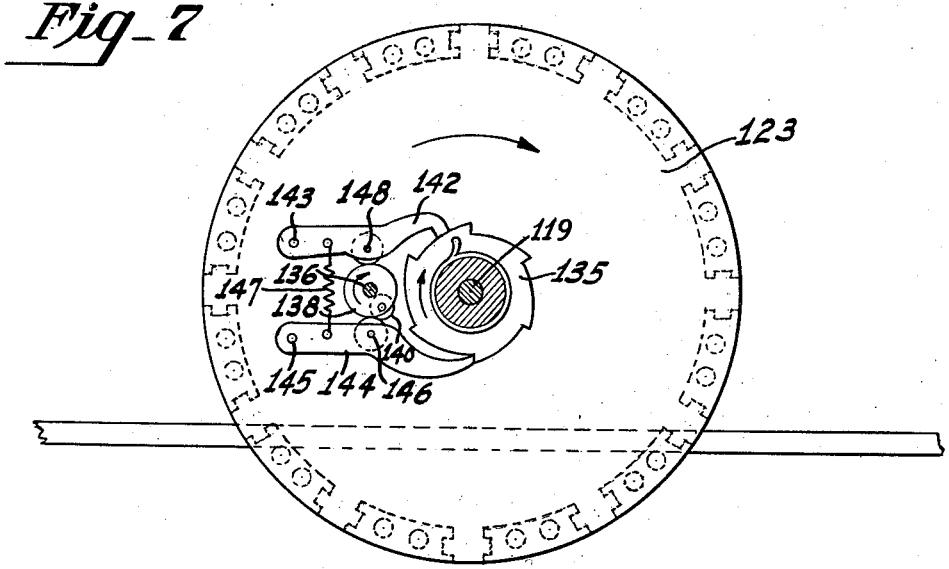
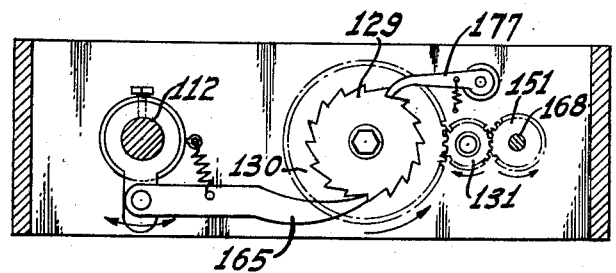
*Fig_6*
INVENTOR
*Arthur J. Murphy*
BY
*Charles H. Brown*
ATTORNEY Feb. 19, 1957  A. J. MURPHY  2,781,788
LOOM
Filed Aug. 20, 1951  10 Sheets-Sheet 8

INVENTOR
*Arthur J. Murphy*
BY
*Charles H. Brown*
ATTORNEY

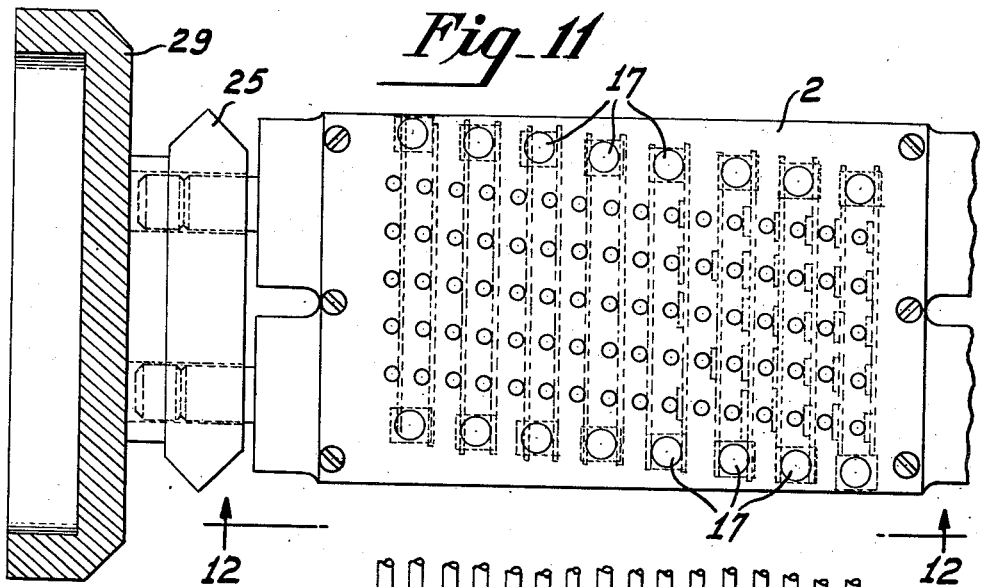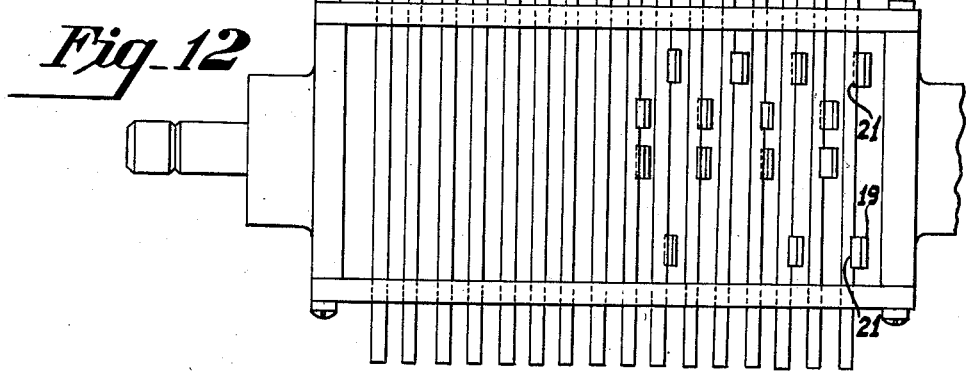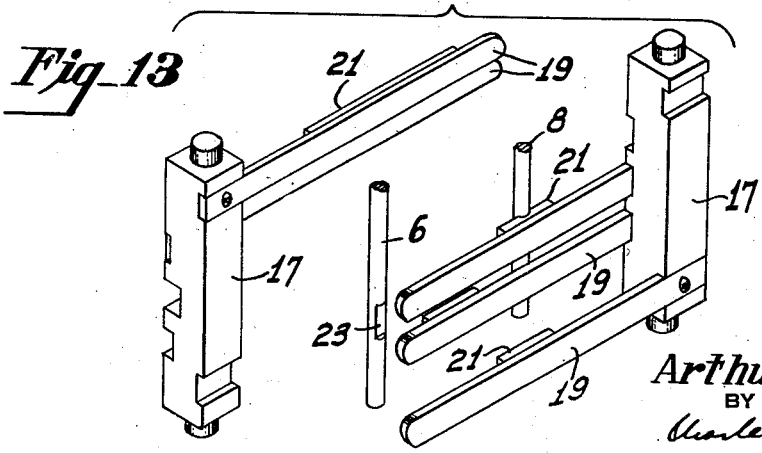

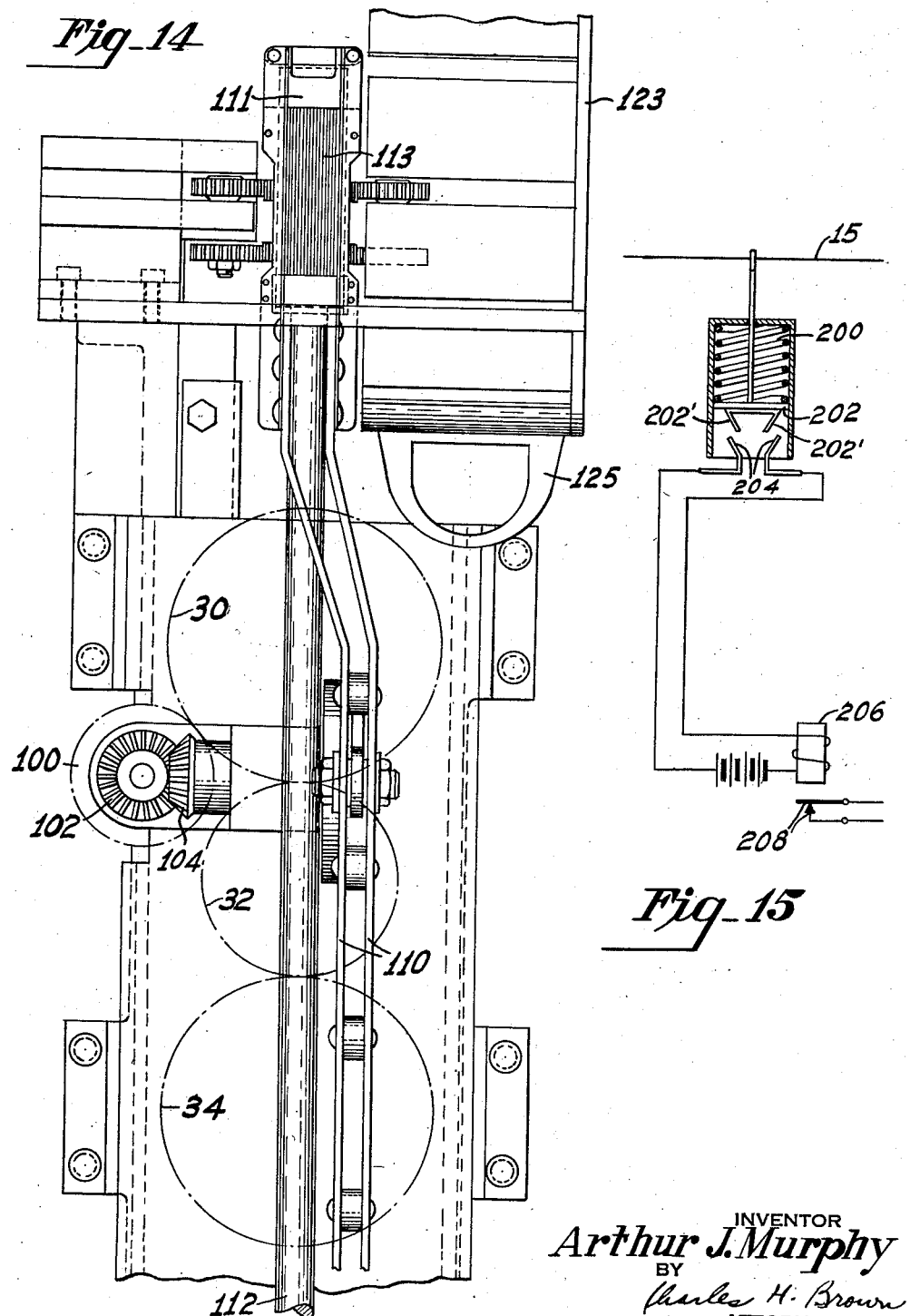

United States Patent Office 2,781,788
Patented Feb. 19, 1957

2,781,788
LOOM

Arthur J. Murphy, Brooklyn, N. Y., assignor of one-half to S. Lawrence Atkins, New York, N. Y.

Application August 20, 1951, Serial No. 242,603

13 Claims. (Cl. 139—11)

The present invention relates to improvements in looms.
The conventional loom employs a harness in which each heddle carries a ring through which the line or warp thread moves. At the lower end of the harness a weight is employed to enable the heddle to return to its rest position. The speed of operation of such a loom is therefore limited by the gravitational force exerted on the weight, among other reasons. A disadvantage of such looms is that the spacing between warp threads through which the shuttle is designed to pass is rather limited. If the speed of such a loom is increased beyond the limitations imposed by the use of weights and the limited spacing between the warp threads in their extreme positions, fouling or tangling of the threads will occur.

Another disadvantage of conventional looms is that an appreciable portion of the mechanical structure appears above the working table as a result of which the vision of the operator is obstructed, particularly so when the entire room in which the operator works is filled with looms.

The foregoing disadvantages are overcome by the present invention. Among the objects of the present invention are: To provide a loom capable of operating at considerably higher speeds than conventional looms; to provide a loom which eliminates the need for weights to return the heddles to a rest position; to enable a loom to operate accurately and efficiently at as high a speed as the heddle will withstand without the harness heddles becoming tangled or fouled; to increase the spacing between warp threads in their extreme positions of travel, thereby providing a wider opening for the shuttles to pass through; to provide a loom having a minimum of superstructure above the working table, thereby enabling the operator an unobstructed view over the loom.

Briefly, the loom of the invention employs a needle-like harness comprising a pair of oscillating or reciprocating needle carriers or holders which move toward or away from each other in opposite directions. These needle carriers are aligned to move in the same vertical path. The needles are rod-like, made of metal (preferably steel), arranged vertically, and are provided with eyes above the working table. The needle carriers or holders are positioned below the table top and are synchronously driven from the same drive shaft. Each needle accommodates a warp thread which passes through the eye thereof. These warp threads preferably extend from below the table top, then pass through the eyes of the needles and the comb of the reed before being packed down in the resulting fabric, and then preferably return to the underside of the table. The eyes of the needles always remain above the table top during the operation of the looms. An automatic shuttle changer is used to introduce a fresh shuttle and to eject an exhausted shuttle without interfering with the continuous operation of the loom.

A feature of the invention is the rotating drum-like automatic shuttle changer which is provided with a plurality of shuttles equally spaced around the periphery thereof, and with means for transferring the weaving operation from a substantially exhausted shuttle to a fresh shuttle. A suitably positioned knife cuts the end parts of the weft thread from the ejected exhausted shuttle subsequent to the introduction of the fresh shuttle. A novel ratchet and spring mechanism assures constant rotational force on the drum.

Another feature is the needle carrier or holder mechanism and driving assembly which enables the synchronous to-and-fro movement of the carriers without disturbance of the needles secured to the carriers.

Still another feature is the compact arrangement of parts constituting the loom, which enables each loom to be sufficiently wide to accommodate the fabric being woven, such as a label or ribbon. The loom can thus be made to be independent of other similar looms, and may be shut down in the event of thread breakage or the need for repair without interfering with the operation of other looms. Each loom may thus be supported on an individual frame, with a plurality of such looms grouped together and driven separately, or detachably driven from a single motor. In the case of breakdown, each loom can be removed and replaced as an entire unit while other units are continuously operating.

A further feature is the reed comb and reed carrier assembly which are light in weight and extremely fast in operation without any vibration. The comb and its carrier are capable of movement without being encumbered by heavy masses of battens, shuttles and gears as in conventional looms.

A more detailed description of the invention follows, in conjunction with drawings, wherein Fig. 1 is a plan view of the loom with the major portion of the table top removed to enable inspection of the component parts.

Figs. 2a and 2b taken together constitute a cross-section taken along 2—2 of Fig. 1.

Fig. 4 is an elevation view of the reed comb assembly a portion of which is shown in section in Fig. 8.

Fig. 5 is a cross-section taken along line 5—5 of both Figs. 1 and 3.

Fig. 6 is the ratchet assembly for driving the shuttle drum and is a section taken along line 6—6 of Fig. 5.

Fig. 7 is the outside elevation of the shuttle drum plate taken along line 7—7 of Fig. 5.

Fig. 8 is a section of the reed comb assembly taken along the line 8—8 of Fig. 4.

Figure 9B:
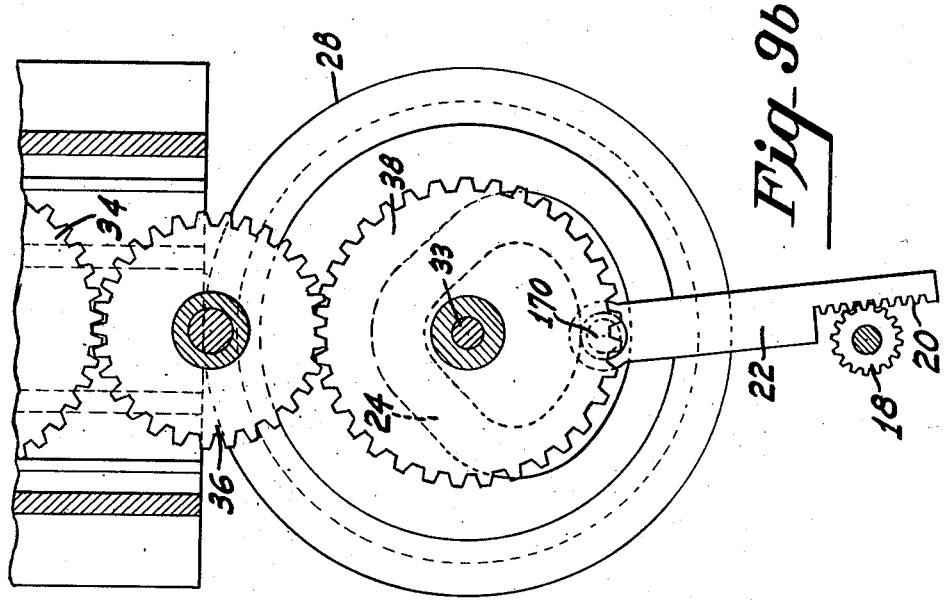
Figure 9A:
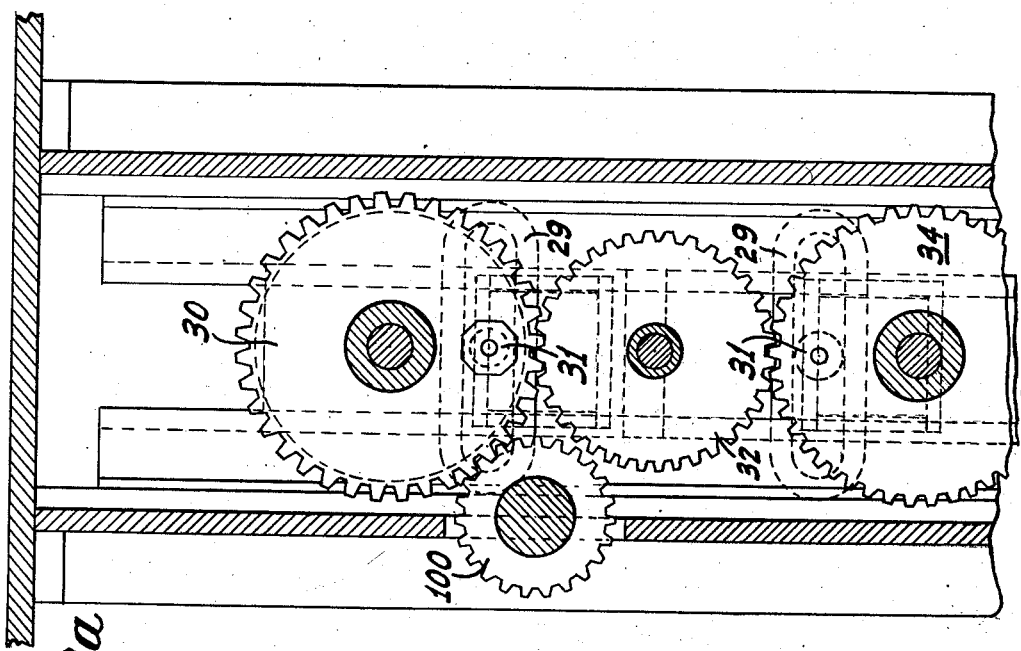

Figs. 9a and 9b are sectional views taken along the line 9—9 of Figs. 2a and 2b respectively.

Fig. 10 is an end view of the shuttle rest taken along the line 10—10 of Fig. 5.

Fig. 11 is a plan view of the needle carrier box or support.

Fig. 12 is a side view of the needle box taken along the line 12—12 of Fig. 11.

Fig. 13 is a perspective view of two spring supports rear and front of the needle carrier box of Figs. 11 and 12, and also a view of a pair of needles showing the manner in which the needles are fastened in the box.

Figure 3:
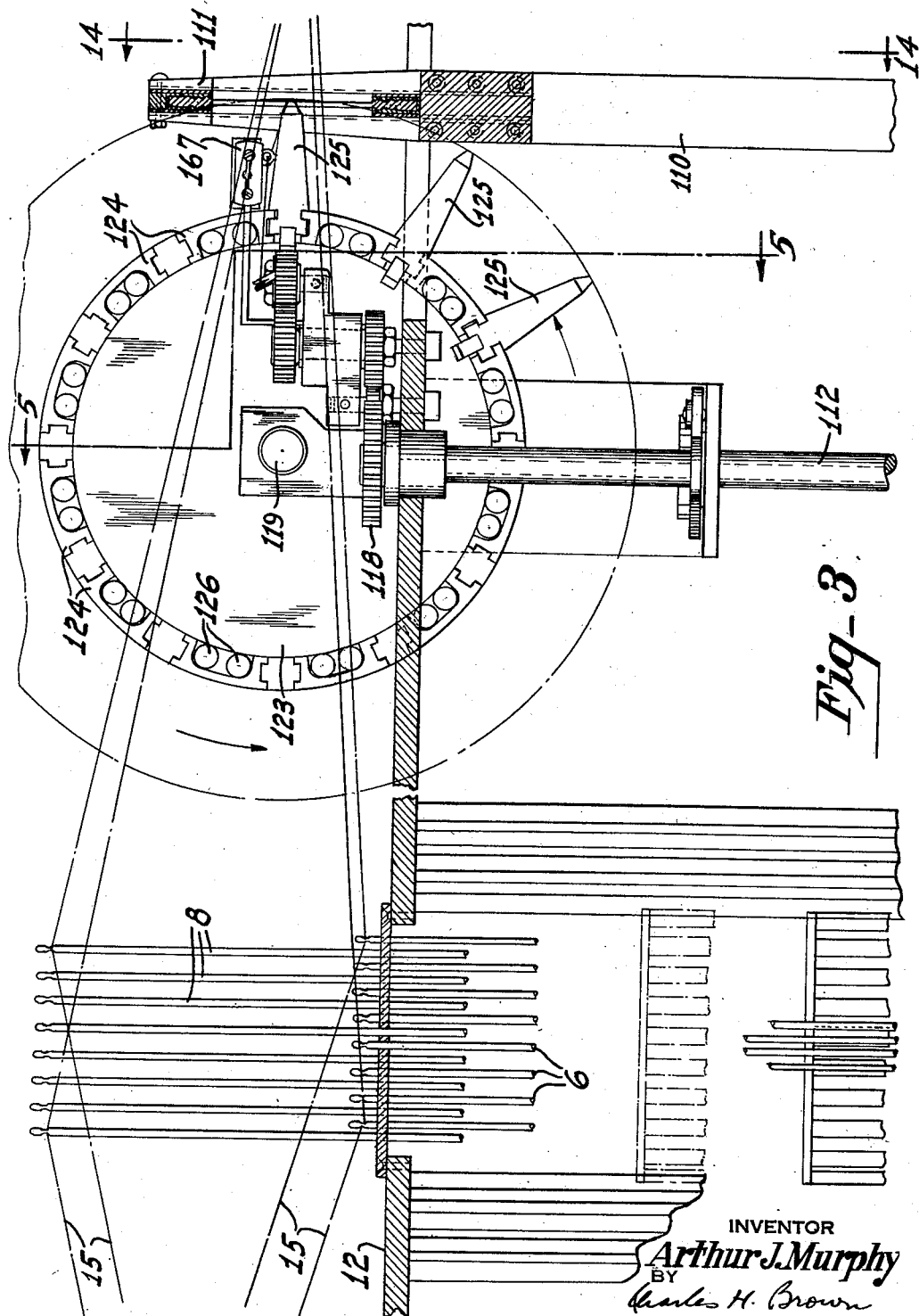
Fig. 3 is a vertical sectional view of the shuttle drum assembly and constitutes a section taken along the line of 3—3 of Fig. 5.

Fig. 14 is an end elevation of the upper part of the loom looking into the reed comb, taken along the line 14—14 of Fig. 3, with additional parts illustrated which are not shown in Fig. 3; and Fig. 15 schematically illustrates an electric circuit for controlling the operation of the drive motor for the loom by the warp threads.

Throughout the figures of the drawing the same parts are designated by the same reference numbers.

The loom of the invention includes as an important element thereof a pair of box-like needle carriers or holders 2 and 4 (note Fig. 2a) which move up and down in a reciprocating motion toward and away from each other. These needle carriers are slidable within frames 180. Carrier 2 supports and carries a plurality of vertically positioned metallic (steel) needles 6, while carrier 4 supports and carries a plurality of vertically positioned metallic needles 8. Needles 6 and 8 are similar to one another except that needles 8 carried by the lower holder 4 are longer than needles 6 carried by the upper carrier. These needles pass through a metallic plate 10 on the table top 12. Each needle is provided with an eye 14 through which a warp thread passes. The metallic plate is provided with a plurality of apertures or holes 11 corresponding in number and position to the needles (note Fig. 1). It should be noted that in both extreme positions of travel of the needle carriers, the eyes of needles are always above the table top (note Fig. 3). The warp threads passing through the eyes of the needles are designated 15 in Fig. 3. In the weaving of certain fabrics or parts thereof, more than one line or warp thread may pass through the eye of any given needle.

In practice, the warp threads will come up from a position below the table top with a tension and braking arrangement for releasing warp threads. These threads will pass over or through a guide in a small electric switch which in the event of thread breakage will operate a relay, in turn, serving to shut down the loom. Fig. 15 schematically illustrates a suitable electric circuit to achieve this result of removing power from the drive motor in the event of thread breakage. The circuit of Fig. 15 includes a contact arrangement having a coil spring 200 maintained under tension by a plunger 202, in turn, held up by the tension in the warp or line thread 15. Plunger 202 carries bronze contacts 202'. Thus contacts 202' are designed to close for bridge contacts 204 when the plunger descends as a result of release in tension on thread 15 whenever breakage of the thread occurs. Closure of the contacts 204 energizes relay 206, in turn, opening relay contacts 208 which are in the series path of the drive motor for the loom. The opening of contacts 208 will thus shut down the loom. There will be a plurality of such electrical circuits corresponding to the number of warp threads used, or if desired, the number of electrical circuits can be reduced by requiring two or more warp threads to build up sufficient tension to control a single plunger. The contacts 208 of the different relays will be arranged in series with one another, whereby the energization of any one relay 206 will interrupt the power supply to the drive motor.

The manner in which the needles 6 or 8 are firmly held in the box-like carriers 2 and 4, respectively, is illustrated in Figs. 11, 12 and 13. The two carriers hold approximately the same number of needles. The upper carrier 2 (note Fig. 2a) is similar in construction to the lower carrier 4 except for the fact that it has additional holes therein for allowing the needles 8 fastened in the lower carrier 4 to slide freely therethrough during motion of the carriers. Each carrier has a plurality of posts 17 to which are secured, at one end, metallic resilient phosphor bronze spring clips 19. These spring clips can, of course, be made of any suitable material. The spring clips 19 on the different posts are properly staggered in position. Each clip 19 has welded thereto at a point intermediate its ends a tab 21 which fits into an indent 23 in each needle. The indents 23 on the different needles and the corresponding tabs 21 designed to fit therein are properly staggered to permit a compact assembly with the needles uniformly positioned as shown in Figs. 11 and 12. If desired, the spring clips 19 can be made with a bend intermediate its ends to replace the tab arrangement.

The arrangement of spring clip 19 and the manner of holding the needle securely in position, enables the needle to be easily removed and replaced merely by pressing the free end of the spring clip in a direction away from the needle so as to remove the tab 21 from the indent 23.

The box-like needle carriers or holders 2 and 4 are mounted in slides 25. While the loom is operating, these needle carriers move constantly in a reciprocating manner in a direction toward or away from one another. This action causes each group of needles to periodically assume extremes of positions, thus causing the line threads to be repeatedly and alternately raised and lowered to allow the shuttle to pass through the opening between the line threads.

Each box-like needle carrier is provided with oppositely positioned rollers 27, controlled by two sets of symmetrically arranged gear trains on opposite sides of the carriers. Each set of gear trains, comprises five intermeshing gears 30, 32, 34, 36, 38. (Note Figs. 2a, 2b, 9a and 9b.) The two sets of gear trains are driven from a common drive shaft 33 (Fig. 2b), in turn, driven by a pulley 28. Pulley 28 is driven from a belt, not shown, in turn coupled to a drive motor.

Figure 1:
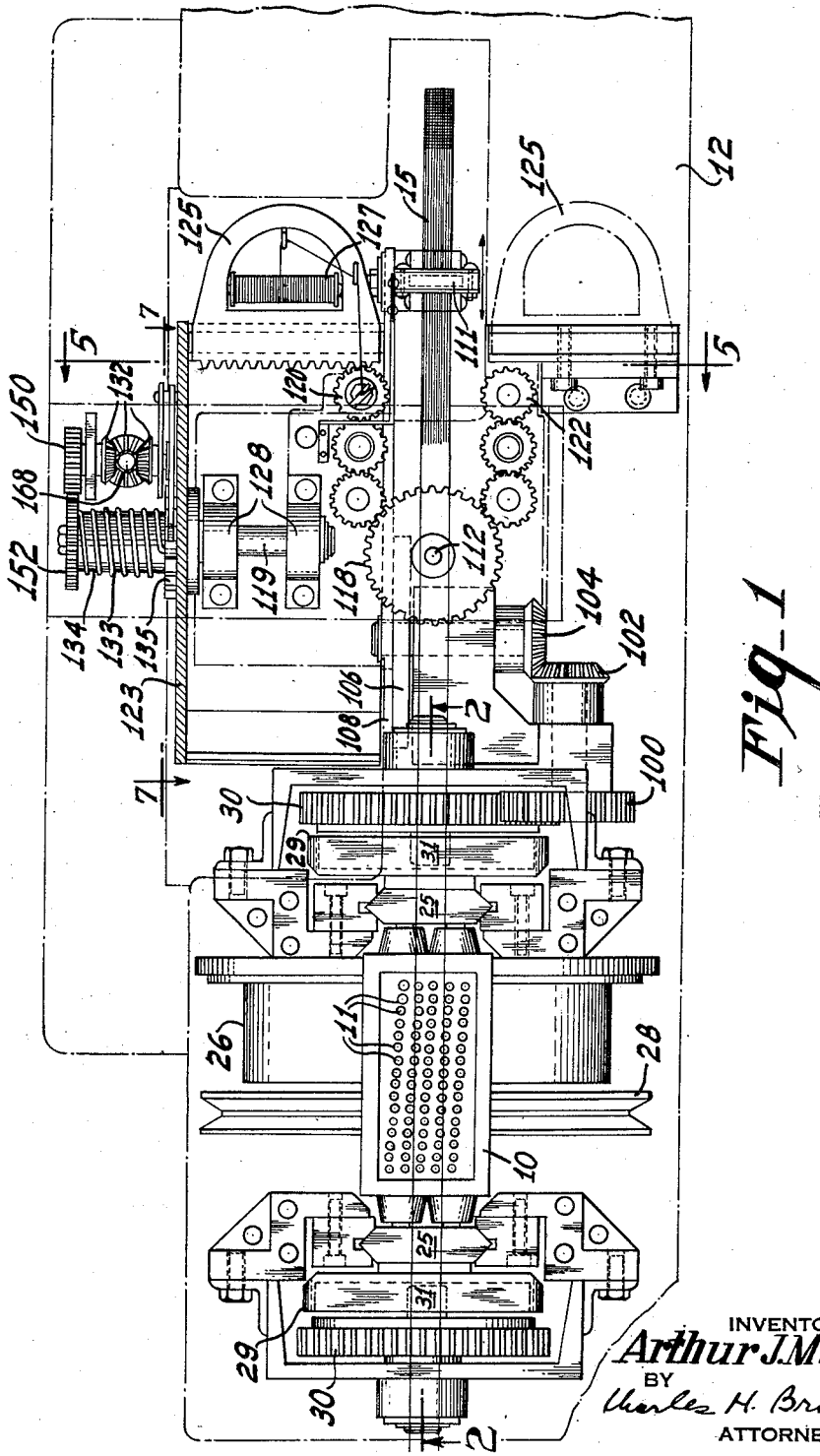

The upper slides 25 which control movement of the upper needle carrier 2 and the lower slides 25 which control movement of the lower needle carrier 4 both accommodate the rollers 27 of the two needle carriers. Each of these slides moves vertically between a pair of frames 180 only one side of which has been shown to simplify the drawing. These slides are secured to yokes 29 carried by the gears 30 and 34. The yokes are provided with horizontally positioned slots in which ride rollers 31. Thus, as the oppositely disposed gears 30 and 34 rotate, they drive their yokes 29 in a vertically reciprocating manner between the stationary frame members 180, the yokes 29, in turn, causing the slides 25 to do likewise, the latter, in turn, compelling the carriers to move vertically to-and-fro. As the gears rotate, the rollers move sideways with movement of the gears, and because the rollers are confined within the horizontally positioned slots of the yokes 29, they cause the yokes and the attached slides 25 to move up and down. This method of causing reciprocal vertical movement from a rotating element is very well known in the art. The yokes and their rollers are shown in Fig. 9a in dotted lines. A plan view is shown in Fig. 1.

It should be understood that the broad aspects of the invention are not limited to the specific details illustrated for obtaining a reciprocating vertical movement of the needle carriers, because, if desired, the illustrated embodiment can be replaced by a crank shaft and communicating rod arrangement as known in the automobile engine art.

In order to pack the warp and weft thread close together, the warp or line threads 15, after passing through the eyes of the needles, are passed through the teeth of the moving comb reed 111. The comb reed 111 is provided with a multiplicity of teeth 113 to permit the different line threads 15 to pass between different teeth. A reed carrier 110 supports the reed 111 and is periodically given a rocking motion by arm 108, in turn, fastened between rotating disc 106 and reed carrier 110 (note Figs. 4 and 8). The reed carrier is pivoted at its lower end, as a result of which the motion of the reed comb 111 is an oscillating motion in the two directions illustrated by the bidirectional arrows in Figs. 1 and 4. The comb reed will move past its center of motion after the movement of the shuttle across the loom and will pack the weft thread from the bobbin on the shuttle tightly in the weave to the other weft threads in the fabric being woven.

To accomplish the motion of the reed comb in proper sequence and properly synchronized with the movement of the other parts of the loom, there is provided a gear 100 (note Figs. 1, 4, 8, 9a and 14) which meshes with one of the gears 30. Thus gear 100 drives a bevel gear 102 which in turn meshes with another bevel gear 104. This last gear 104 is secured to and rotates disc 106, the latter, in turn, carrying one end of link 108 in a rotary movement. The comb reed makes one complete oscillation for each cross trip of a shuttle. The shuttle, in turn, passes through the opening between the warp threads and across the loom each time and very shortly after the needles assume their extreme positions of travel. When the shuttle has completed its trip through the line threads, the reed comb will be at the left of Figs. 1 and 4 and ready to travel to the right in order to pack the weft or shuttle threads tightly in the weave. The simplicity of operation and assembly of parts in which the lightweight comb and its carrier alone travel enables the reed to operate at extremely fast speeds without undue vibration. This is an advantage not obtainable in the conventional loom wherein the reed and comb are not divorced from the relatively heavy shuttles, gears and other mechanisms which are incapable of moving at any relatively great speed.

The automatic shuttle changer of the invention comprises a drum-like magazine 123 having a series of longitudinally arranged elongated spaced shuttle guides 124 accommodating therebetween a plurality of shuttles 125 evenly spaced around the periphery of the drum. Each shuttle contains a bobbin 127. Note Fig. 1. The spaced shuttle guides are fastened to the drum by round head screws 126, and serve the dual function of tracks (guides) and supports for the shuttles. The drum magazine 123 is open at one end, as shown in Fig. 5.

The purpose of the automatic shuttle changer is to introduce a fresh shuttle and to eject an operative shuttle when exhausted without interrupting the continuous operation of the loom. Stated otherwise, the loom of the invention permits a continuous weave for the entire length of the warp threads without the necessity for stopping the loom to insert a new bobbin or shuttle whenever the thread on the old bobbin is used up.

The drum magazine 123 is mounted on a shaft 119 housed in bearing housings 128. That shuttle 125 on the drum which is in operative position is shown in solid lines in Fig. 1 at one position of rest on one side of the reed comb, and in dotted lines at its other position of rest on the other side of the reed comb. Trains of gears on both sides of the loom rapidly transport the shuttle with its bobbin 127 across the loom through the opening between the warp or line threads. The gears 120 and 122 on opposite sides of the loom engage the teeth on the shuttle to produce the desired reciprocating motion in a horizontal plane in generally known manner. Intermittent motion is given to the gears 120 and 122 by gear trains linked to gear 118, in turn, driven by shaft 112. (Note Fig. 1, 3 and 5.) Shaft 112 is driven by meshing bevel gears 116 and 114, in turn, driven from shaft 16 from gear 18. (Note Fig. 2b.) Gear 18 engages and is controlled by rack 20 on arm 22 which, in turn, has a roller 170 at one end (the end opposite the rack) moving in a groove 24 of generally involute form in one side of a disc or plate 24′ mounted on the common drive shaft 33 (note Figs. 2b and 9b). The disc 24′, arm 22, rack 20 and gear 18 are positioned within a housing 26. In this manner, intermittent movement is transmitted.

The manner in which the drum magazine supports the plurality of shuttles is shown in Fig. 3. Only three of these shuttles 125 have been shown, in order not to detract from the simplicity of the illustration, but it should be understood that the drum 123 accommodates twelve of these shuttles in the spaces between adjacently positioned shuttle guides and track supports 124. That shuttle which is in the horizontal plane adjacent the reed comb 111 and symmetrically positioned between warp threads 15 is in the effective position for passing the weft thread across the loom. The drum rotates in the direction of the curved arrow to replace an exhausted shuttle by a shuttle from below the table top. The exhausted shuttle is carried upward on the rotating drum 123 above the table top so that it can be replaced at the leisure of the operator before those guides and track supports 124 accommodating that particular shuttle dips below the table top 12 as the drum rotates. A knife or razor blade 167 acts to sever the last portion of weft between the selvage and the exhausted bobbin after it is ejected from the effective position.

The manner in which the drum 123 is caused to rotate is shown in some detail in Figs. 1, 5, 6 and 7. The drum 123 is secured to a shaft 119, in turn, fastened to a spool 134 on which a torsion spring 133 is wound. The purpose of spring 133 is to build up a tension which suddenly rotates the drum 123 whenever, and only whenever, an exhausted shuttle and its bobbin is to be effectively replaced. One end of spring 133 fits into a notch or cut out portion on ratchet 135, while the other end is secured to gear 152. Drum 123, spool 134 and shaft 119 move as a single unit when spring tension is released.

Fig. 6 indicates the manner in which spring tension is built up for suddenly driving the drum 123. Fig. 7 indicates the manner in which this spring pressure or tension is utilized to drive the drum in twelve sudden steps corresponding to the number of shuttles accommodated by the drum 123. Stated in other words, Fig. 7 shows the spring release mechanism for the intermittent rotation of the drum 123. This release mechanism is mounted on the drum 123.

An inspection of Figs. 5 and 6 will indicate that when the shaft 112 of the shuttle drive mechanism is given a rocking motion to drive the shuttle across the loom, the motion of the shaft 112 actuates a pawl 165 which serves to drive a ratchet 129. The thrust on the ratchet can be set to come only as the shuttle is in the home position thereby limiting the action of indexing or shuttle replacement to that instant only. Stop pawl 177 prevents the ratchet from unwinding. Attached to ratchet 129 is a gear 130 engaging gear 131, in turn, engaging gear 151 secured to shaft 168. Shaft 168 has a set of three forty-five degree bevel gears 132 secured thereto at the end opposite gear 151, as shown in Fig. 5.

One of the outside bevel gears 132 drives a gear 150 which meshes with gear 152 (note Figs. 1 and 5). Gear 152 which is free to rotate on shaft 119 applies tension to the spring 133 wound on spool 134, thus building up spring tension while the shuttle is being used up, in order to drive the drum 123 when the shuttle is about exhausted. Gear 152 is turned only partially and in one direction at each impulse by the shuttle gearing.

The other outside bevel gear 132 drives a shaft 136 (note Fig. 7), in turn, fastened to a crank plate 138 having a cam roller 140 on the side thereof. This cam roller 140 is designed to sequentially control pawls 142 and 144 by means of the rollers 146 and 148 respectively mounted on these pawls. Pawls 142 and 144 alternately hold and release the ratchet 135 on which tension is built up by the coiled spring 133. Pawl 142 is pivoted at 143 while pawl 144 is pivoted at 145. A spring 147, secured at both ends to these pawls, serves to force the rollers 146 and 148 into engagement with the disc 138.

As the tension increases on the spring 133, the cam roller 140 keeps moving toward pawl 144. When cam roller engages pawl roller 146, the pawl 144 is forced outward to permit the ratchet 135 to suddenly rotate drum 123 due to tension on spring 133, for a short distance until the ratchet 135 is stopped by pawl 142 locking into the next tooth at the correct position on the drum for shuttle movement across the loom. The movement of drum 123 is sufficient to enable the replacement of an exhausted shuttle by a fresh one, and to cause the movement of the exhausted shuttle on the drum out of the effective position to a higher position on the drum above the table top. When the ratchet is stopped by pawl 142, the free end of pawl 144 will rest on the ratchet 135 one-half way between teeth, in a manner similar to the way pawl 142 is shown resting on ratchet 135 in Fig. 7. When cam roller 140 engages roller 148 of pawl 142, a similar movement of ratchet 135 and drum 123 will take place with the pawls resting as shown in Fig. 7.

It will of course be understood that the movements of all parts of the loom are properly synchronized and the dimensions of the parts and the numbers of teeth on the different gears are carefully selected to enable the desired functions to be performed. It will also be understood that the loom can be positioned vertically, horizontally or angularly, and that regardless of the positioning of the loom, the needle carriers will be aligned to move in the same longitudinal path.

What is claimed is:

1. In a loom, a plurality of parallel needles of two different lengths having eyes for carrying warp threads, a needle carrier on one side of said eyes supporting the needles of smaller length, another needle carrier also on said one side of said eyes supporting the needles of longer length, said needles of longer length passing entirely through the carrier for said smaller length needles, and means for continuously driving said needle carriers toward and away from each other.

2. In a loom, a plurality of parallel needles for carrying warp threads, a frame, a needle carrier supporting some of said needles and slidable within said frame, another needle carrier supporting the other needles and also slidable within said frame, said needle carriers being aligned to move in the same longitudinal path, and means on opposite sides of said frame for synchronously driving said needle carriers toward and away from each other.

3. In a loom, a plurality of vertical needle-like warp thread carrying elements of two different lengths, slidable carriers arranged one above the other for supporting and moving the needle-like warp thread carrying elements, one of slidable carriers supporting the thread carrying elements of smaller length while the other slidable carrier supports the thread carrying elements of the longer length, said one carrier having apertures therein permitting the longer length needles to pass therethrough, and means for driving said slidable carriers in a reciprocating manner.

4. In a loom having a table top, a plurality of needles of two different lengths projecting above said table top for carrying warp threads positioned above said table top, a needle carrier below said table top supporting the needles of smaller length, another needle carrier below said first needle carrier and supporting the needles of longer length, said first needle carrier having apertures therein permitting the longer length needles to pass completely therethrough, and means for driving the said needle carriers in a reciprocating manner toward and away from each other, the lengths of said needles and the dimensions and spacing of said needle carriers being such that the upper portions of said needles always remain above said table top during the operation of said loom.

5. In a loom having a table top, a vertically reciprocating needle carrier positioned below said table top and supporting a plurality of vertically positioned spaced needles which project above the table top during all positions of said carrier, said needles having in the top portions thereof which always protrude above the table top means for carrying warp threads, each of said needles having an indent therein in the lower portion below the table top, said carrier surrounding said lower portions of the needles and being provided with elements adapted to enter said indents for securing said needles to said carrier.

6. A loom in accordance with claim 5, wherein another needle carrier is also positioned below said table top and supports needles, said last needles projecting above said table top and carrying warp threads in a manner similar to said first mentioned needles.

7. In a loom, a reciprocating needle carrier supporting a plurality of spaced needles having eyes for carrying warp threads, each of said needles having an indent therein intermediate the length thereof, said carrier surrounding said indents and being provided with elements adapted to enter said indents for securing said needles to said carrier.

8. In a loom, in combination, a plurality of physically spaced parallel needles for carrying warp threads, a needle carrier supporting some of said needles, another needle carrier supporting the other needles, said needle carriers being aligned to move in the same path, means for simultaneously driving said needle carriers in a reciprocating manner toward and away from each other without changing the longitudinal spacing between said needles, a reed assembly pivoted at one end and having a comb at the other end for enabling said warp threads to pass therethrough, and means linked to said drive means for imparting a rocking motion to said reed assembly during each reciprocating cycle of operation of said needle carrier.

9. In a loom having a table top, in combination, a plurality of needles of two different lengths projecting above said table top for carrying warp threads positioned above said table top, a needle carrier below said table top supporting the needles of smaller length, another needle carrier below said first needle carrier and supporting the needles of longer length, said first needle carrier having apertures therein permitting the longer length needles to pass completely therethrough, and means for driving said needle carriers in a reciprocating manner toward and away from each other, the lengths of said needles and the dimensions and spacing of said needle carriers being such that the upper portions of said needles always remain above said table top during the operation of said loom, a reed assembly pivoted at one end below said table top and having a comb at the other end above said table top for enabling said warp threads to pass therethrough, and means linked to said drive means for imparting a rocking motion to said reed assembly during each reciprocating cycle of operation of said needle carrier.

10. In a loom, a plurality of parallel needles for carrying warp threads, a frame, a needle carrier supporting some of said needles and slidable within said frame, another needle carrier supporting the other needles and also slidable within said frame, gears on opposite sides of said frame for driving said needle carriers toward and away from each other, a light weight comb reed supported by a reed carrier pivoted at one end, said comb reed having teeth through which said warp threads are adapted to pass, a rotatable disc linked to said reed carrier for imparting a to-and-fro rocking motion to said reed carrier, and means including a bevel gear for driving said disc from one of said first gears.

11. In a loom having a table top, a plurality of needles of two different lengths projecting above said table top for carrying warp threads positioned above said table top, a needle carrier below said table top supporting the needles of smaller length, another needle carrier below said first needle carrier and supporting the needles of longer length, said needle carriers being aligned to travel in the same longitudinal path, said first needle carrier having apertures therein permitting the longer length needles to pass completely therethrough, and means for driving the said needle carriers in a reciprocating manner toward and away from each other, the lengths of said needles and the dimensions and spacing of said needle carriers being such that the upper portions of said needles always remain above said table top during the operation of said loom.

12. In a loom having a table top, a plurality of parallel needles for carrying warp threads, a needle carrier supporting some of the needles and mounted on that side of the table top opposite the side on which the threads appear, another needle carrier supporting the other needles and mounted on the same side of the table top as said first needle carrier, said needle carriers being aligned to move in the same longitudinal path, and means for driving said needle carriers in a reciprocating manner towards and away from each other along said path.

13. In a loom, a plurality of parallel needles for carrying warp threads, a needle carrier supporting some of said needles, another needle carrier supporting the other needles, said needle carriers being vertically aligned to move in the same vertical path, and means for driving said needle carriers in a reciprocating manner toward and away from each other along said path, said means comprising similar sets of gears arranged on opposite sides of said needle carriers and a common drive shaft for said gears.

References Cited in the file of this patent

UNITED STATES PATENTS

| | | |
|---|---|---|
| 659,952 | Baker et al. | Oct. 16, 1900 |
| 714,274 | Baker et al. | Nov. 25, 1902 |
| 1,058,628 | Rosenthal | Apr. 8, 1913 |
| 1,752,804 | Nicolet | Apr. 1, 1930 |
| 1,859,952 | Boddanffy | May 24, 1932 |
| 1,862,687 | Larsen | June 14, 1932 |
| 2,055,553 | Nicolet | Sept. 29, 1936 |

FOREIGN PATENTS

| | | |
|---|---|---|
| 21,874 | Great Britain | of 1902 |
| 22,825 | Great Britain | of 1900 |